United States Patent
Lin et al.

(10) Patent No.: US 10,359,695 B2
(45) Date of Patent: Jul. 23, 2019

(54) METHOD OF FABRICATING AN INTEGRATED CIRCUIT WITH NON-PRINTABLE DUMMY FEATURES

(71) Applicant: Taiwan Semiconductor Manufacturing Company, Ltd., Hsin-Chu (TW)

(72) Inventors: Jyuh-Fuh Lin, Miaoli County (TW); Cheng-Hung Chen, Hsinchu County (TW); Pei-Yi Liu, Changhua County (TW); Wen-Chuan Wang, Hsinchu (TW); Shy-Jay Lin, Hsinchu County (TW); Burn Jeng Lin, Hsinchu (TW)

(73) Assignee: TAIWAN SEMICONDUCTOR MANUFACTURING COMPANY, LTD., Hsin-Chu (TW)

( * ) Notice: Subject to any disclaimer, the term of this patent is extended or adjusted under 35 U.S.C. 154(b) by 90 days.

(21) Appl. No.: 15/448,367

(22) Filed: Mar. 2, 2017

(65) Prior Publication Data
US 2017/0176849 A1 Jun. 22, 2017

Related U.S. Application Data

(63) Continuation of application No. 14/310,182, filed on Jun. 20, 2014, now Pat. No. 9,594,862.

(51) Int. Cl.
*G03F 1/36* (2012.01)
*G06F 17/50* (2006.01)
(Continued)

(52) U.S. Cl.
CPC ............ *G03F 1/36* (2013.01); *G06F 17/5068* (2013.01); *G06F 17/5072* (2013.01);
(Continued)

(58) Field of Classification Search
CPC ............ G06F 17/5068; G06F 17/5081; G06F 2217/12; G06F 17/5072; G06F 1/36; H01L 27/0207; H01L 21/76229; H01L 27/0203
See application file for complete search history.

(56) References Cited

U.S. PATENT DOCUMENTS 6,566,017 B1 * 5/2003 Chen .................... G03F 1/38
430/296
6,690,045 B2 * 2/2004 Shinkawata ...... H01L 21/31053
257/258
(Continued)

FOREIGN PATENT DOCUMENTS

JP 2008-171170 7/2008
KR 10-2008-0001441 1/2008
(Continued)

OTHER PUBLICATIONS

U.S. Appl. No. 14/252,464, filed Apr. 14, 2014, by inventors Jyuh-Fuh Lin, Pei-Yi Liu, Cheng-Hung Chen, Wen-Chuan Wang, Shy-Jay Lin, and Burn Jeng Lin for "Method of Fabricating an Integrated Circuit with Block Dummy for Optimized Pattern Density Uniformity," 21 pages of text, 7 pages of drawings.
(Continued)

*Primary Examiner* — Helen Rossoshek
(74) *Attorney, Agent, or Firm* — Haynes and Boone, LLP (57) ABSTRACT

The present disclosure provides one embodiment of an IC method that includes receiving an IC design layout, which has a plurality of main features and a plurality of space blocks. The IC method also includes calculating an optimized block dummy density ratio $r_0$ to optimize a uniformity of pattern density (UPD), determining a target block dummy density ratio R, determining size, pitch and type of a non-printable dummy feature, generating a pattern for
(Continued)

dummy features and adding the dummy features in the IC design layout.

20 Claims, 10 Drawing Sheets

(51) Int. Cl.
*H01L 27/02* (2006.01)
*H01L 21/762* (2006.01)

(52) U.S. Cl.
CPC ...... *H01L 27/0207* (2013.01); *G06F 2217/12* (2013.01); *H01L 21/76229* (2013.01); *H01L 27/0203* (2013.01)

(56) References Cited

U.S. PATENT DOCUMENTS

| | | | | |
|---|---|---|---|---|
| 6,905,967 B1* | 6/2005 | Tian | ................. | H01L 21/31053 |
| | | | | 257/620 |
| 7,197,737 B1* | 3/2007 | Iandolo | ............... | G06F 17/5068 |
| | | | | 716/124 |
| 7,701,034 B2* | 4/2010 | Chuang | ........... | H01L 21/823437 |
| | | | | 257/288 |
| 7,934,173 B2* | 4/2011 | Shyu | ......................... | G03F 1/36 |
| | | | | 430/5 |
| 7,971,158 B2* | 6/2011 | Anderson | ........... | G06F 17/5068 |
| | | | | 430/313 |
| 9,335,624 B2* | 5/2016 | Lee | ............................. | G03F 1/00 |
| 9,436,787 B2* | 9/2016 | Lin | ..................... | G06F 17/5068 |
| 9,436,788 B2* | 9/2016 | Lin | ..................... | G06F 17/5068 |
| 2004/0194050 A1* | 9/2004 | Hwang | ...................... | G03F 1/36 |
| | | | | 430/5 |
| 2007/0175657 A1* | 8/2007 | Itoh | ...................... | H05K 1/0271 |
| | | | | 174/260 |
| 2007/0190811 A1* | 8/2007 | Park | .................... | G03F 7/70466 |
| | | | | 438/800 |
| 2008/0179754 A1 | 7/2008 | Hirabayashi | | |
| 2009/0267268 A1* | 10/2009 | Yoneda | ................. | B82Y 10/00 |
| | | | | 264/319 |
| 2009/0278569 A1* | 11/2009 | Taoka | ..................... | E21B 43/24 |
| | | | | 326/101 |
| 2010/0251913 A1* | 10/2010 | Meijer | ................... | B82Y 10/00 |
| | | | | 101/368 |
| 2011/0156149 A1* | 6/2011 | Wang | .................... | H01L 21/324 |
| | | | | 257/368 |
| 2011/0227189 A1* | 9/2011 | Wu | ................... | H01L 21/76229 |
| | | | | 257/499 |
| 2013/0061196 A1* | 3/2013 | Cheng | ................. | G06F 17/5068 |
| | | | | 716/132 |
| 2014/0040836 A1* | 2/2014 | Chou | .................. | G06F 17/5068 |
| | | | | 716/52 |
| 2014/0205953 A1* | 7/2014 | Lin | ....................... | G03F 7/0035 |
| | | | | 430/312 |
| 2014/0277681 A1* | 9/2014 | Chang | .............. | G05B 19/41835 |
| | | | | 700/121 |
| 2015/0072531 A1* | 3/2015 | Tung | ......................... | G03F 1/38 |
| | | | | 438/703 |
| 2015/0121317 A1* | 4/2015 | Lee | ............................ | G03F 1/00 |
| | | | | 716/52 |
| 2015/0140478 A1* | 5/2015 | Chen | ......................... | G03F 1/36 |
| | | | | 430/5 |
| 2015/0294057 A1* | 10/2015 | Lin | ..................... | G06F 17/5068 |
| | | | | 716/54 |
| 2017/0139330 A1* | 5/2017 | Hotzel | ..................... | G03F 1/36 |

FOREIGN PATENT DOCUMENTS

| | | |
|---|---|---|
| KR | 10-2008-0019894 | 3/2008 |
| KR | 10-871750 | 12/2008 |
| KR | 20080001439 | 12/2008 |

OTHER PUBLICATIONS

U.S. Appl. No. 14/253,282, filed Apr. 15, 2014, by inventors Jyuh-Fuh Lin, Pei-Yi Liu, Cheng-Hung Chen, Wen-Chuan Wang, Shy-Jay Lin, and Burn Jeng Lin for "Method of Fabricating an Integrated Circuit with Block Dummy for Optimized Pattern Density Uniformity," 20 pages of text, 13 pages of drawings.
Korean Office Action issued in application No. 10-2014-0191011 filed Dec. 26, 2016.
Notice of Allowance dated Oct. 21, 2016 in Taiwan Patent Application No. 10-2014-0191011.

* cited by examiner

METHOD OF FABRICATING AN INTEGRATED CIRCUIT WITH NON-PRINTABLE DUMMY FEATURES

PRIORITY DATA

This is a continuation of U.S. patent application Ser. No. 14/310,182, filed on Jun. 20, 2014, entitled "Method of Fabricating an Integrated Circuit with Non-Printable Dummy Features," the disclosure of which is hereby incorporated by reference in its entirety.

BACKGROUND

This application is related to patent application U.S. Ser. No. 14/252,464 filed on Apr. 14, 2014, as "Method of Fabricating an Integrated Circuit with Optimized Pattern Density Uniformity," and U.S. Ser. No. 14/253,282 filed on Apr. 15, 2014, as "Method of Fabricating an Integrated Circuit with Block Dummy for Optimized Pattern Density Uniformity," the entire disclosures of which are hereby incorporated by reference.

In integrated circuit (IC) manufacture, it is common to utilize optical proximity correction (OPC) to improve an imaging resolution of an IC pattern during a lithography patterning process. However, along with the progress of semiconductor technology, the feature sizes are continually getting smaller. The existing OPC methods to add various dummy features have a limited degree of freedom and effectiveness to tune the pattern density and poor uniformity of the pattern density. This presents issues such as dynamic space charge effect and micro-loading effect when an electron-beam lithography technology is used to form the IC pattern. Furthermore, during the process to insert dummy features, various simulations and calculations associated with the dummy features take more time, causing an increase in cost. Therefore, what is needed is a method for IC design and mask making to effectively and efficiently adjusting an IC pattern to address the above issues.

BRIEF DESCRIPTION OF THE DRAWINGS

Aspects of the present disclosure are best understood from the following detailed description when read in association with the accompanying figures. It is noted that, in accordance with the standard practice in the industry, various features in the drawings are not drawn to scale. In fact, the dimensions of illustrated features may be arbitrarily increased or decreased for clarity of discussion.

DETAILED DESCRIPTION

It is understood that the following disclosure provides many different embodiments, or examples, for implementing different features of the invention. Specific examples of components and arrangements are described below to simplify the present disclosure. These are, of course, merely examples and are not intended to be limiting. The present disclosure may repeat reference numerals and/or letters in the various examples. This repetition is for the purpose of simplicity and clarity and does not in itself dictate a relationship between the various embodiments and/or configurations discussed.

Figure 1:
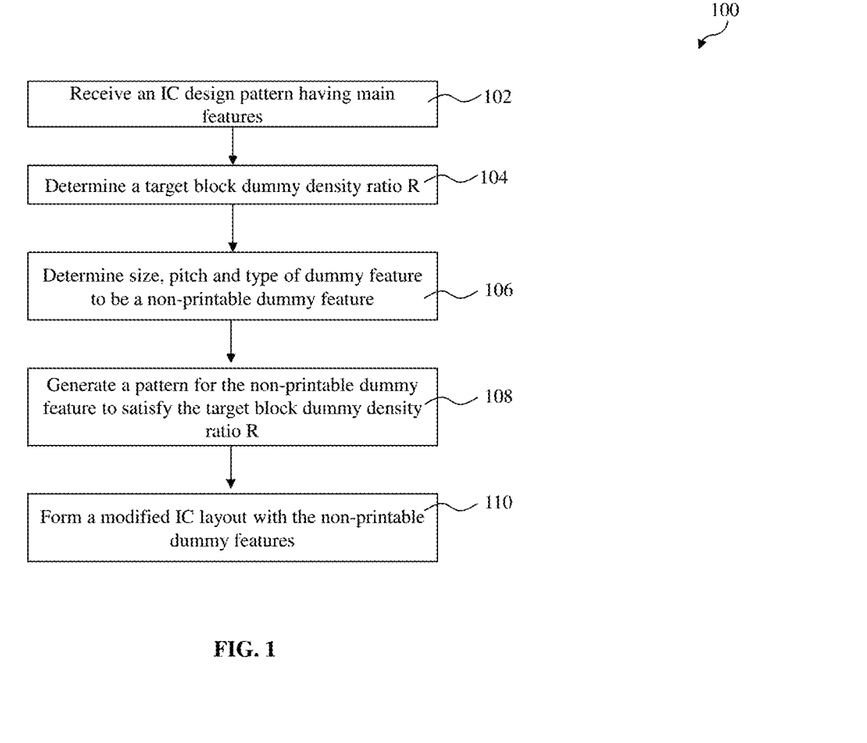
FIG. 1 is a flowchart of an embodiment of an integrated circuit (IC) method constructed in accordance with some embodiments.

FIG. 1 is a flowchart of a method 100 for fabricating an integrated circuit (IC) according to various aspects of the present disclosure in one or more embodiments. The method 100 provides a procedure to generate dummy features with optimized circuit performance, improved dummy pattern uniformity and reduced e-beam space charge effect and micro-loading effect when original pattern density distribution is broad. The dummy features are features added to the IC design pattern for various fabrication functions. In one embodiment, dummy features are added to the IC design pattern to vary pattern density to improve chemical mechanical polishing (CMP) process applied during IC fabrication. In another embodiment, dummy features are added to the IC design pattern to vary the thermal effect and to improve a thermal annealing process applied during IC fabrication. In yet another embodiment, dummy features are added to the IC design pattern to correct optical proximity effects and enhance the imaging resolution for a lithography patterning processes applied to the semiconductor substrate during IC fabrication. Dummy features may include sub-resolution features (non-printable to the semiconductor substrate) and are also referred to as optical proximity correction (OPC) assistant features. The method 100 is described with reference to a device shown in FIGS. 2 through 12.

The method 100 begins at step 102 by receiving an IC design layout, such as from a designer. In one example, the designer is a design house. In another example, the designer is a design team separated from a semiconductor manufacture assigned for making IC products according to the IC design layout. In various embodiments, the semiconductor manufacturer is capable for making photomasks, semiconductor wafers, or both. The IC design layout includes various geometrical patterns designed for an IC product and based on the specification of the IC product.

The IC design layout is presented in one or more data files having the information of geometrical patterns. In one example, the IC design layout is expressed in a GDS or GDS-II format, as well known in the art. The designer, based on the specification of the IC product to be manufactured, implements a proper design procedure to generate the IC design layout. The design procedure may include logic design, physical design, and place and route. As an example, a portion of the IC design layout includes various IC features (also referred to as main features), such as active regions, gate electrodes, source and drains, metal lines, contacts/vias, and openings for bonding pads, to be formed on a semiconductor substrate (such as a silicon wafer) or on various material layers disposed over the semiconductor substrate. The IC design layout may include additional features, such as those features for imaging effect, processing enhancement, and/or mask identification information.

Figure 2:
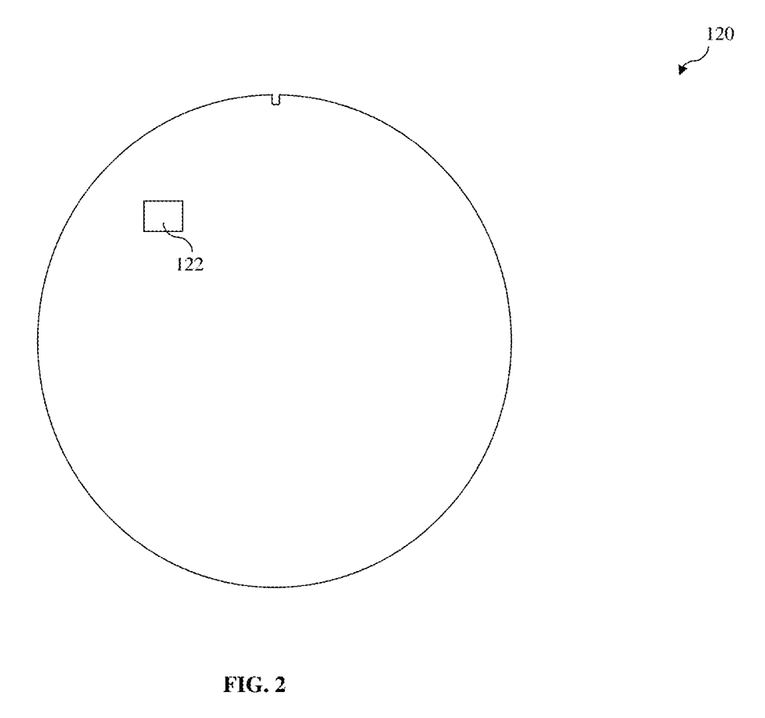
FIG. 2 is a schematic view of a semiconductor substrate constructed in accordance with some embodiments.

FIG. 2 illustrates a schematic view of a semiconductor substrate 120 constructed according to one embodiment. In the present embodiment, the semiconductor substrate 120 is a semiconductor wafer, such as silicon wafer. In other embodiments, the semiconductor substrate 120 may alternatively or additionally include other semiconductor material, such as germanium (Ge), silicon germanium (SiGe), silicon carbide (SiC), indium arsenide (InAs), or indium phosphide (InP), or a suitable alloy semiconductor, such as silicon germanium carbide, gallium arsenic phosphide, or gallium indium phosphide. Alternatively, the substrate 120 may include a non-semiconductor material such as a glass substrate for thin-film-transistor liquid crystal display (TFT-LCD) devices. The semiconductor substrate 120 may include various doped regions, dielectric features, and multilevel interconnects. In one embodiment, the substrate 120 includes various doped features for various microelectronic components, such as a complementary metal-oxide-semiconductor field-effect transistor (CMOSFET), imaging sensor, memory cell, and/or capacitive element. In another embodiment, the substrate 120 includes conductive material features and dielectric material features configured for coupling and isolating various microelectronic components, respectively. In another embodiment, the semiconductor substrate 120 includes one or more material layers (such as a dielectric material layer) formed thereon.

The semiconductor substrate 120 further includes various circuit regions. One or more ICs are to be formed in each circuit region 122, separated from each other by scribe lines. In one embodiment, an IC design layout for a single IC chip is to be formed in each of the circuit regions, hereinafter referred to as IC chip 122.

Figure 3:
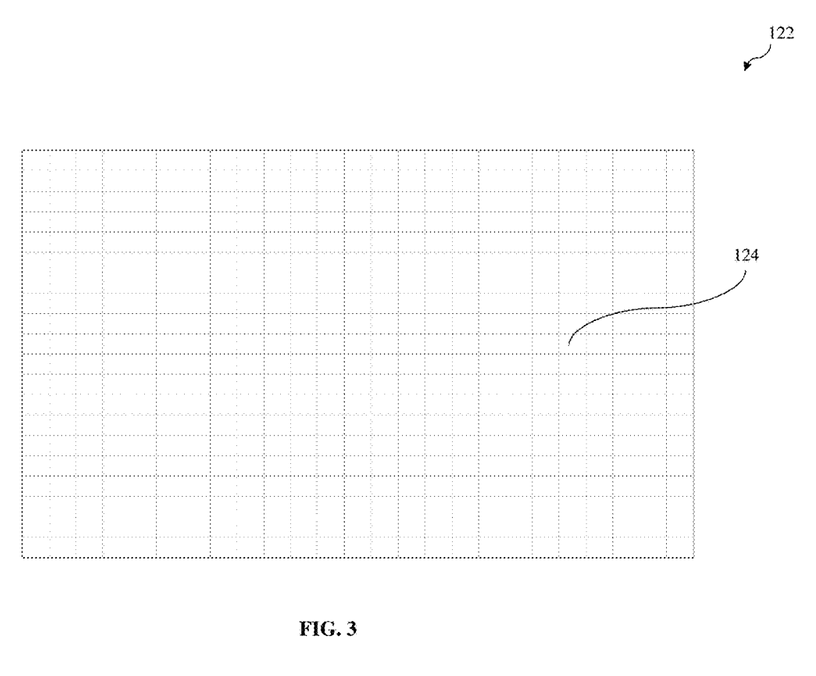
FIG. 3 is a schematic view of the semiconductor substrate of FIG. 2, in portion, constructed in accordance with some embodiments.

Referring to FIG. 3, each IC chip 122 is divided into a plurality of areas (also referred to templates) 124 for subsequent operations. In the present embodiment, the templates 124 each have an equal area. The number of templates 124 in the full chip is "N". The templates 124 are referred to as 1, 2, 3, . . . , i, . . . and N, respectively. In the present example, each template 124 includes a rectangle or a square region in the semiconductor substrate 120. The number N may be determined according to one or more factors, such as calculation efficiency. When the number N is large, the operations in the following process may take a longer time to complete. When the number N is small, the operations in the following process may take less time to complete, but may result in reduced optimization effectiveness. Accordingly, the number N is properly chosen according to one or more factors, such as engineer experience and/or previous processed data (such as historic data collected from execution of the method 100).

Figure 4:
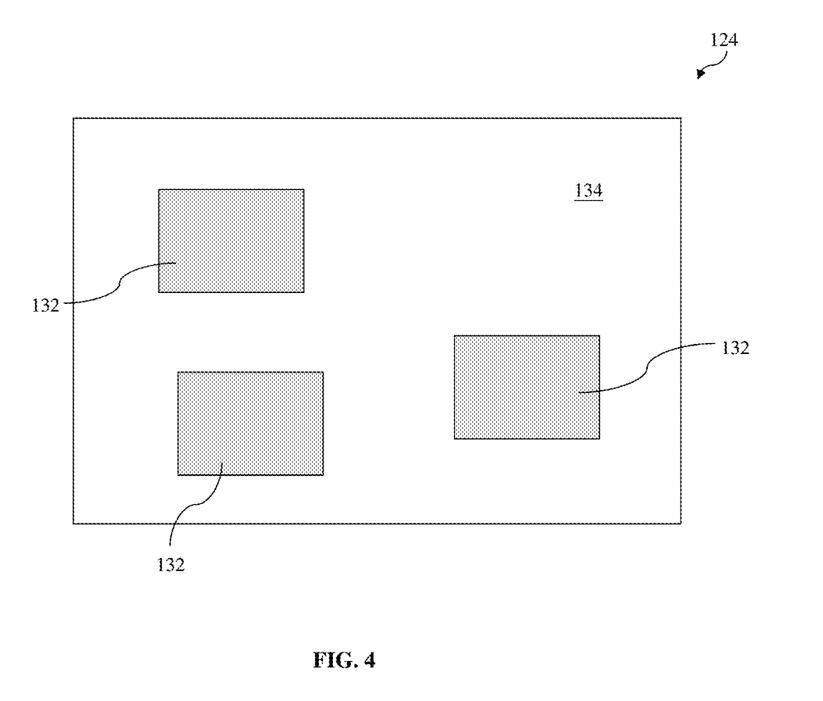
FIGS. 4, 5 and 6 illustrate an integrated circuit (IC) design layout constructed in accordance with some embodiments.

Referring to FIG. 4, the IC design layout to be formed on the chip is defined in various templates 124. Each template 124 includes a portion of the IC design layout. The IC design layout defined in different templates may be different from each other, depending on individual integrated circuit and the corresponding IC design layout.

The IC design layout includes main features 132 designed and configured to form a portion of the integrated circuit. A main feature is a geometrical pattern that defines an IC feature, such as contact/via hole, to be formed on the semiconductor substrate 120. The IC design layout also includes background regions 134 without main features. In the following description of the method 100, the IC design layout is described with the semiconductor substrate 120, even though the IC design layout is not yet transferred to the semiconductor substrate 120 during those operations stages of the method 100. Illustrated in FIG. 4 is only a portion of the IC design layout. Other portions of the IC design layout may have different patterns, such as including various circuit features 132 and background regions 134.

Figure 5:
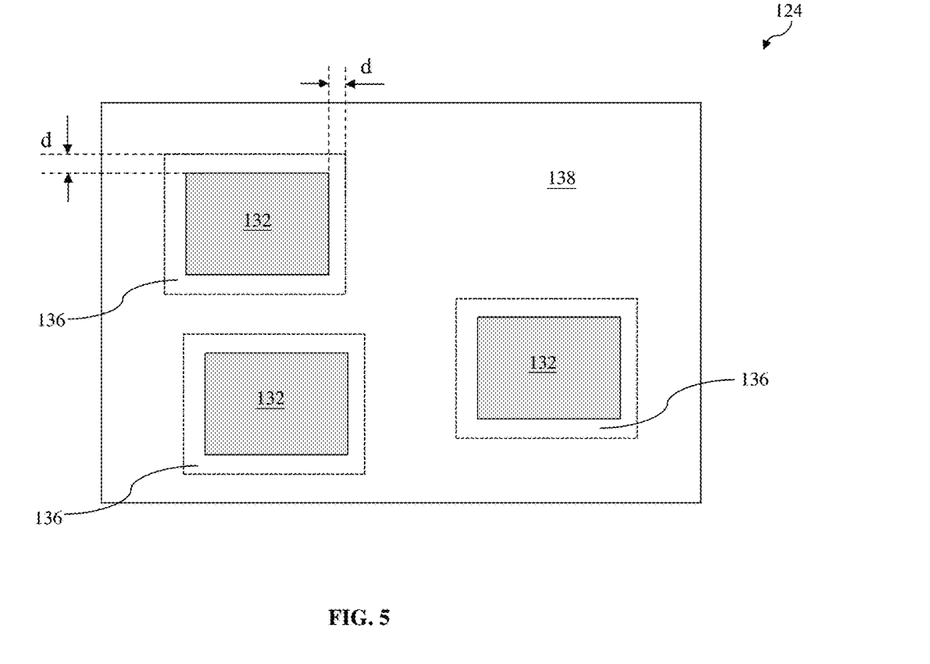

Referring to FIG. 5, a space isolation dimension (simply referred to as isolation distance) "d" is a parameter to define a forbidden area 136 surrounding a main feature 132, in which features (excluding dummy features) should not be inserted. The IC pattern in the template 124 includes a plurality of main features 132 and accordingly a plurality of forbidden areas 136 surrounding the respective main features 132. By excluding the main features 132 and the forbidden areas 136, the remaining regions in the semiconductor substrate are defined as space block(s) 138 for dummy insertion. The IC pattern includes the main features 132, the forbidden areas 136 and space block(s) 138.

When one isolation distance d is chosen, a set of space blocks 138 is generated accordingly and is referred to as a space block layer (or simply a space layer). When a plurality of isolation distances are chosen, a plurality of space layers are generated, respectively. Each of the space layers defines a set of space blocks 138 different from those defined in other space layers. The method of generating space layers is described in the above-listed application that has been incorporated by reference.

Figure 6:
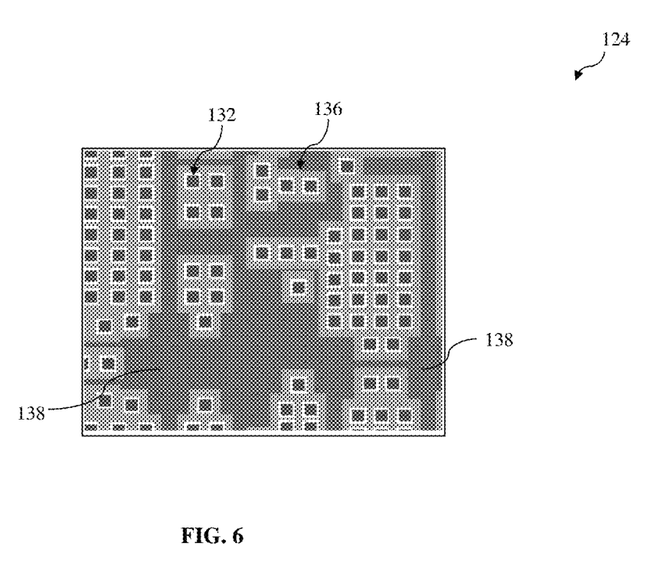

A space block layer is also illustrated in FIG. 6 according to another example. The IC design layout in the template 124 includes a plurality of main features 132 with the respective forbidden areas 136. The remaining regions, other than the main features 132 with the respective forbidden areas 136, provide the space blocks 138.

A pattern density for each template 124, in various space block layers, is calculated. Therefore, each pattern density may be a function of the template and the space block layer. The method of calculating pattern density is described in the above-listed application that has been incorporated by reference. A block dummy density ratio r for each space block layer is then calculated. A total pattern density PD in one template refers to the pattern density of various features, including main features and dummy features (to be formed) in that template. The total pattern density PD is defined as:

$$PD = PD_0 + r \cdot PD_s. \quad \text{(equation 1)}$$

Here, $PD_0$ is main pattern density, $PD_s$ is block dummy pattern density and the parameter "r" is a block dummy density ratio to all templates (1, 2, 3, . . . , and N) of the semiconductor substrate 120. The block dummy pattern density PDs contributes to the total pattern density by $r \cdot PD_s$ instead of $PD_s$ since the space blocks 138 are generally not completely filled with dummy features. As block dummy density ratio, the parameter "r" is related to the filling ratio.

In equation 1, the block dummy density ratio "r" is a weighting factor or a gray level of the space blocks in the template when each of those space blocks is treated as a dummy feature. The block dummy density ratio "r" is also referred to as to the block dummy weighting variable. The block dummy density ratio "r" has a value ranging between 0 and 1, as $0 \leq r \leq 1$. The dummy features are not defined yet at this stage. Each of the space blocks 138 is treated as one dummy feature until real dummy features are determined at the step 106. The block dummy density ratio "r" is a universal parameter to various templates.

Referring back to FIG. 1, the method 100 proceeds to step 104 by determining a target block dummy density ratio R. The target block dummy density ratio R may be determined based on uniformity of pattern density (UPD) process window and process throughput.

In the present embodiment, the block dummy density ratio "r" is determined for a given space block layer by a UPD statistical formula as and is noted as $r_0$, $$r_0 = (\overline{PD_0 \cdot PD_s} - \overline{PD_0} \cdot \overline{PD_s})/\sigma_s^2 \quad \text{(equation 2)}$$

where $\sigma_s$ is the standard deviation of the block dummy pattern density.

Various parameters in the equation 2 are further defined below. $\overline{PD_0}$ is the average main pattern density defined as an average of the main pattern densities over various templates. Specifically, the average main pattern density $\overline{PD_0}$ is defined in and calculated by the following formula, $$\overline{PD_0}=[PD_0(1)+PD_0(2)+PD_0(3)+\ldots+PD_0(i)+\ldots+PD_0(N)]/N \quad \text{(equation 3)}$$

$PD_0$ (i) represents the main pattern density of the template "i". The average main pattern density $\overline{PD_0}$ remains the same for various space block layers.

Similarly, $\overline{PD_s}$ is the average dummy pattern density defined in and calculated by the following formula, $$\overline{PD_s}=[PD_s(1)+PD_s(2)+PD_s(3)+\ldots+PD_s(i)+\ldots+PD_s(N)]/N \quad \text{(equation 4)}$$

The average dummy pattern density $\overline{PD_s}$ is for the given space block layer and varies over different space block layers.

The term $\overline{PD_0 \cdot PD_s}$ is the average of the product $PD_0 \cdot PD_s$ over all templates (templates 1, 2, 3, ..., and N). The parameter σ is the standard deviation of the total pattern density and is defined as:

$$\sigma^2=\overline{PD^2}-\overline{PD}^2 \quad \text{(equation 5)}$$

where $\overline{PD^2}$ is the average of $PD^2$ over all templates and $\overline{PD}$ is the average of the total pattern density PD over all templates. The average total pattern density $\overline{PD}$ is defined as:

$$PD=\overline{PD_0}+r\overline{PD_s} \quad \text{(equation 6)}$$

while $\overline{PD^2}$ is defined as:

$$\overline{PD^2}=\overline{(PD_0+rPD_s)^2} \quad \text{(equation 7)}$$

In furtherance of the present embodiment, the PDU statistical formula derived in equation 2 is generated by the procedure as below. In equation 5, the parameter $\sigma^2$ is defined as $\sigma^2=\overline{PD^2}-\overline{PD}^2$. With further mathematical operation, it is found that the parameter $\sigma^2$ is the function of r in the form $$\sigma^2=ar^2+br+c \quad \text{(equation 8)}$$

where the coefficients a and b are functions of space isolation distance d, and the coefficient c is a constant. For the given space block layer and the corresponding isolation distance d, the parameter σ has a minimum at certain r, which means the pattern density variation over templates is minimized. The minimum of the parameter σ is determined by restraining σ'(r)=0, leading to r=−b/(2a) that further gives the equation 2. Thus determined block dummy density ratio "$r_0$" is also referred to as the minimized block dummy density ratio R.

The minimized block dummy density ratio $r_0$ is determined to optimize the UPD for the corresponding space block layer. However, when the block dummy density ratio "r" is close enough to $r_0$ in a certain range, it still provides acceptable pattern density uniformity and leaves a room for tuning other parameters, such as process window and throughput impact.

The throughput may include simulation time, the duration of the etch process to form the dummy features on the semiconductor substrate 120, and/or e-beam writing time during the e-beam lithography process to transfer the main features 132 and the dummy features to be formed to the semiconductor substrate 120.

The process window is a collection of values of process parameters that allow circuit to be manufactured under desired specifications. In one embodiment, the process window is one factor to be considered in determining a proper isolation distance "d" and the block dummy density ratio "r". In one example, the process window for the critical dimension (CD) is considered to ensure the CD is in the desired range. When the pattern density changes, the corresponding exposure intensity relative to the exposure threshold varies, causing CD variation. When the pattern density is higher or lower, the CD may be out of specification.

With consideration all above factors, the target block dummy density ratio R is determined for each space block layer.

Figure 7A:
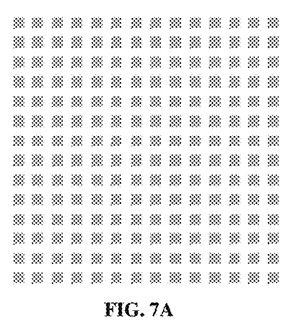
FIGS. 7A-7B and 8A-8B are diagrammatical views of various patterns of dummy features vs. respective exposure intensity profiles in accordance with some embodiments.
Figure 7B:
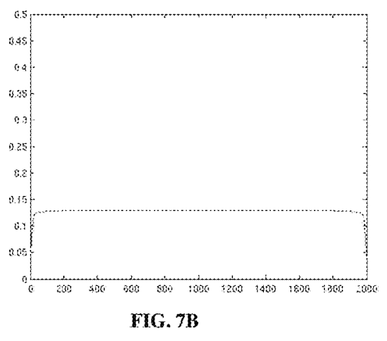
Figure 8A:
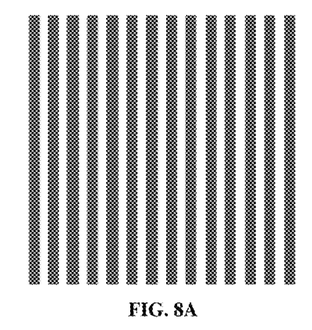
Figure 8B:
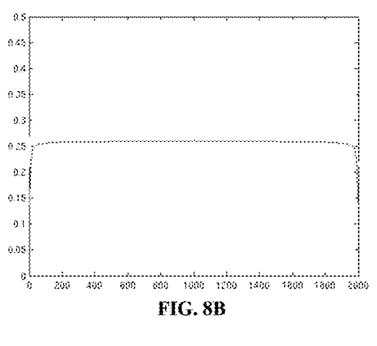

The method 100 proceeds to step 106 by determining a size (and pitch) and type of dummy features 170 to be non-printable dummy features. Different type of the dummy features 170 may have different exposure threshold doses. For example, an exposure threshold dose of a hole-type dummy feature 170 (as shown in FIGS. 7A and 7B) is lower than an exposure threshold dose of a bar grating type dummy features (as shown in FIGS. 8A and 8B). Bar type of dummies may have higher intensity under the same size/pitch (duty ratio), because of having a higher pattern density. In another words, when a pattern density is too high, the dummy features are printable.

With varying size, pitch and type of the dummy feature 170, a pattern maximum intensity is changed under a same exposure dose. In the present embodiment, by using a threshold cutline with intensity profile, a printing CD is simulated (e.g. by Gaussian Kernel algorithm). The dummy feature 170 (in terms of size, pitch and type) is then selected and its maximum intensity is lower than the model threshold by a safe range (e.g. 25%), Thus the dummy features 170 are not printable in a mask, or a semiconductor wafer, now named as non-printable dummy feature and labeled with the reference number 172. In another embodiment for e-beam lithography, an exposure dose is adjusted for the dummy feature 170 to obtain different intensity profile. The exposure dose is then selected to make a maximum intensity of the dummy feature 170 be lower than the model threshold by a safe range (e.g. 25%) and the dummy feature 170 is non-printable.

The method 100 proceeds to step 108 by generating a pattern for the non-printable dummy feature 172 to satisfy the target block dummy density ratio R. The pattern of the non-printable dummy features 172 may be a matrix of squares (as illustrated in FIG. 9), or rectangles (bars, (as illustrated in FIG. 10), or irregular dummy array (as illustrated in FIG. 11).

Figure 9:
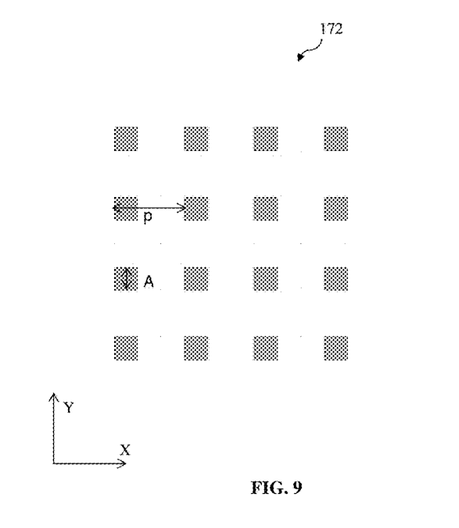
FIGS. 9-11 illustrate patterns of dummy features constructed in accordance with some embodiments.

In FIG. 9, the non-printable dummy features 172 are configured in a two dimensional array in a space block. The non-printable dummy features 172 are squares with a side dimension "A". The dummy array has a periodic constant "p" (pitch) in both directions (X and Y directions). The pitch p and side dimension A are chosen such that $A^2/p^2=R$. The parameter R is the target block dummy density ratio.

Figure 10:
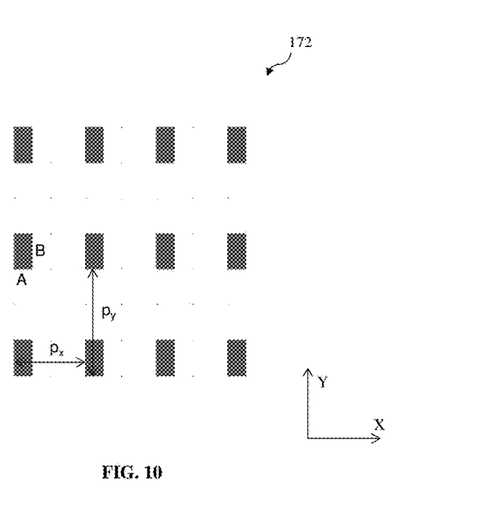

In FIG. 10, the non-printable dummy features 172 are configured in a two dimensional array in a space block. The non-printable dummy features 172 are rectangles with side dimensions "A" and "B", respectively. The sub-resolution dummy array has a periodic constant "$p_x$" and "$p_y$" in X and Y directions, respectively. The pitches and side dimensions are chosen such that $AB/p_x p_y=R$. The parameter R is the target block dummy density ratio.

Figure 11:
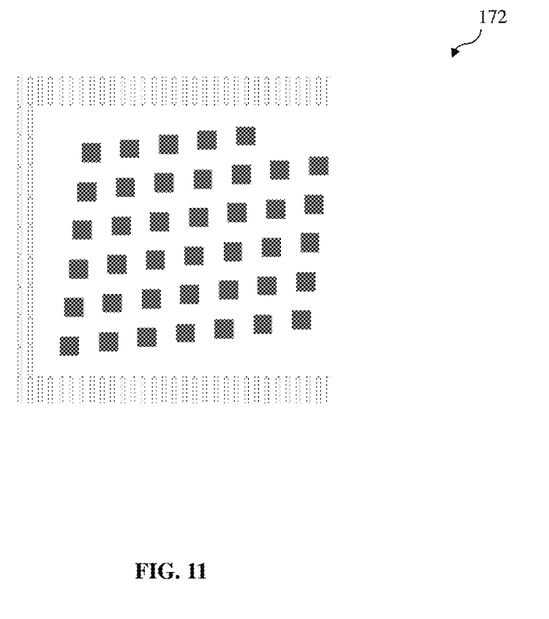

In FIG. 11, the non-printable dummy features 172 may be configured to an irregular dummy array. Here the nonprintable dummy features 172 are chosen such that total dummy area/block region area=R. The parameter R is the target block dummy density ratio.

In some embodiments, dummy features may include printable features designed to tune the pattern density for improved effect of a manufacturing process, such as CMP or thermal annealing. As an example, for an implant layer, or contact/via layer, non-printable dummy features may be preferred, while for a poly layer, or a metal, printable dummy features may be preferred.

In some embodiment, the dummy features may include sub-resolution features for optical proximity correction (OPC) to enhance the imaging resolution. Those sub-resolution features are nonprintable to the semiconductor substrate 120 by the corresponding photolithography process.

Figure 12:
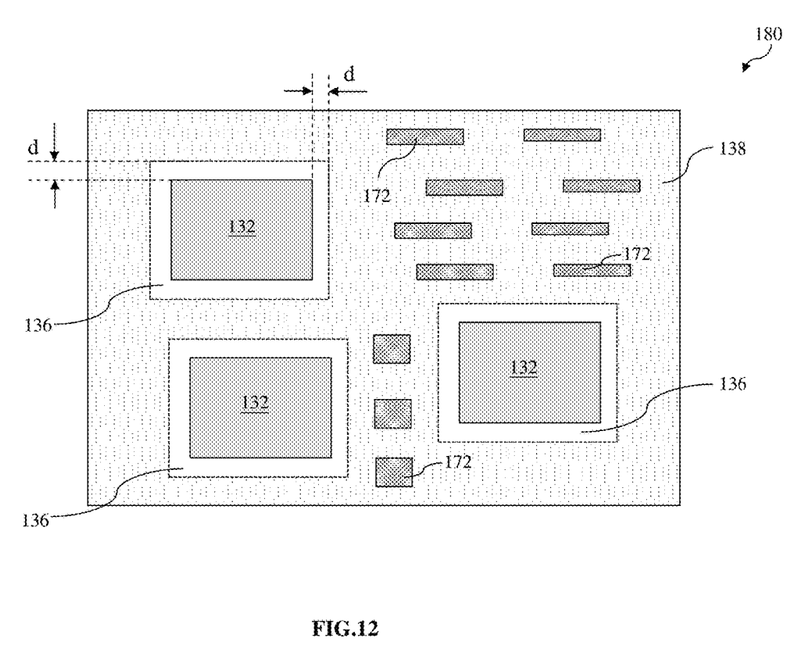
FIG. 12 illustrates an integrated circuit (IC) design layout constructed in accordance with some embodiments.

Referring to FIGS. 1 and 12, the method 100 proceeds to step 110 by adding the non-printable dummy feature 172 to the IC design layout (the each respective template 124) to form a modified IC design layout (each respective modified template 180). A tape-out of the modified IC design layout is generated for mask making or e-beam writing. The tape-out represents an IC design layout in a format that can be used for mask making or e-beam writing.

In one embodiment, the modified IC design layout is used to form a mask for a photolithography exposure process that transfers the IC pattern into a photoresist layer coated on the semiconductor substrate 120. For example, an e-beam or a mechanism of multiple e-beams is used to form a pattern on a mask (photomask or reticle) based on the modified IC pattern with the non-printable dummy feature 172. The mask can be formed in various suitable technologies. In one embodiment, the mask is formed using the binary technology. In this case, the mask pattern includes opaque regions and transparent regions. In one example, the binary mask includes a transparent substrate (e.g., fused quartz), and an opaque material (e.g., chromium) coated in the opaque regions of the mask. In another embodiment, the mask is formed using a phase shift technology. In the phase shift mask (PSM), various features in the pattern formed on the mask are configured to have proper phase difference to enhance the resolution and imaging quality. In various examples, the PSM may be an attenuated PSM or an alternating PSM known in the art. In other examples, the mask may be transmissive mask or reflective mask, such as extreme ultraviolet mask (EUV) mask.

In another embodiment, the modified IC design layout is used to directly write the main features 132 to (the e-beam sensitive resist layer coated on) the semiconductor substrate 120 by e-beam in an e-beam lithography process.

Additional steps can be provided before, during, and after the method 100, and some of the steps described can be replaced, eliminated, or moved around for additional embodiments of the method 100.

Based on the above, the present disclosure offers a method for fabricating a semiconductor device. The method employs choosing dummy features'size and pitch to have its maximum intensity be less than an exposure threshold dose of a main feature and make the dummy feature be non-printable. The method also employs choosing a pattern of the non-printable dummy feature according a target block dummy density ratio R to optimize uniformity of pattern density. The method demonstrates reducing space charge effect in e-beam lithography, improving uniformity of pattern density, improving process window and throughput.

Thus, the present disclosure provides one embodiment of an integrated circuit (IC) method. The IC method includes receiving an IC design layout, which has a plurality of main features and a plurality of space blocks. The IC method also includes determining a target block dummy density ratio R of the IC design layout, determining a size, a pitch and a type for a non-printable dummy feature, generating a pattern for the non-printable dummy feature according to the target block dummy density ratio R and adding the non-printable dummy features in the IC design layout.

The present disclosure provides another embodiment of an IC method. The method includes receiving an IC design layout designed to be formed on a semiconductor substrate. The IC design layout includes a plurality of main features and a plurality of space blocks. The method also includes calculating an optimized block dummy density ratio $r_0$ of the IC design layout $r_0$ to obtain optimized uniformity of pattern density (UPD), determining a target block dummy density ratio R of the IC design layout according to the optimized block dummy density ratio $r_0$. The method also includes choosing a size, a pitch and a type of dummy features according to its maximum intensity, which is less than an exposure threshold dose of the main feature. The method also includes generating a pattern of the dummy features according to the target block dummy density ratio R and generating a modified IC design layout by adding the dummy features.

The present disclosure also provides another embodiment of an IC method. The method includes receiving an IC design layout having a plurality of main features and space blocks. The method also includes calculating an optimized block dummy density ratio $r_0$ of the IC design layout to optimize an uniformity of pattern density (UPD), determining a target block dummy density ratio R of the IC design layout according to the optimized block dummy density ratio $r_0$. The method also includes determining size and pitch of a non-printable dummy feature according to a maximum intensity of the non-printable dummy feature being less than an exposure threshold dose of the main features. The method also includes determining a pattern of the non-printable dummy feature according to the target block dummy density ratio R and adding the non-printable dummy features in the space blocks to form a modified IC design layout.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments disclosed herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An integrated circuit (IC) fabrication method comprising:
    extracting, by a computer processor, an IC design layout presented in one or more data files, the IC design layout designed to be formed on a semiconductor substrate and a plurality of main features and a plurality of space blocks;
    calculating, by the computer processor, an optimized block dummy density ratio $r_0$ of the IC design layout to obtain an optimized uniformity of pattern density (UPD), the optimized block dummy density ratio $r_0$ being calculated from a total pattern density associated with a subdivisional area of the IC design layout;

determining a target block dummy density ratio R of the IC design layout according to the optimized block dummy density ratio $r_0$;

choosing a type of dummy features according to an associated maximum intensity that is less than an exposure threshold dose of at least one of the main features;

generating a pattern of the dummy features according to the target block dummy density ratio R;

generating a modified IC design layout by adding the dummy features to the IC design layout; and fabricating an integrated circuit according to the modified IC design layout.

2. The method of claim 1, wherein the generating the pattern of the dummy features comprises determining a size and pitch of the dummy features to have the associated maximum intensity be less than the exposure threshold dose of the main features.

3. The method of claim 1, wherein the dummy features are not printable in a lithography process.

4. The method of claim 1, wherein the generating the pattern of the dummy features includes generating square type features with size A and configured in an array with a pitch p such that a ratio $A^2/p^2$ is equal to the target block dummy density ratio R.

5. The method of claim 1, wherein the generating the pattern of the dummy features includes generating rectangle type features that spans a first dimension A in a first direction and a second dimension B in a second direction orthogonal to the first direction, wherein the dummy features are configure in an array with a first pitch $p_x$ in the first direction and a second pitch $p_y$ in the second direction such that a ratio $AB/(p_x p_y)$ is equal to the target block dummy density ratio R.

6. The method of claim 1, wherein the generating the pattern of the dummy features includes generating rectangle type features that spans a first dimension A in a first direction and a second dimension B in a second direction that is not orthogonal to the first direction, wherein the dummy features are configure in an array with a first pitch $p_x$ in the first direction and a second pitch $p_y$ in the second direction such that a ratio $AB/(p_x p_y)$ is equal to the target block dummy density ratio R.

7. The method of claim 1, wherein the generating of the dummy features includes generating an irregular dummy array, such that a total dummy area/space block area is equal to the target block dummy density ratio R.

8. The method of claim 1, wherein the dummy features include an optical proximity correction feature that enhances imaging resolution.

9. The method of claim 1, wherein the IC design layout includes a plurality of subdivisional areas, wherein the subdivisional area is one of the plurality of subdivisional areas, and wherein at least one of the plurality of subdivisional areas includes a plurality of main features and a plurality of space blocks.

10. The method of claim 1, wherein the optimized block dummy density ratio $r_0$ is calculated by a formula $r_0 = (\overline{PD_0} \cdot \overline{PD_S} - \overline{PD_0 \cdot PD_S})/\sigma_s^2$ wherein:

$\overline{PD_0}$ is an average of a main pattern density;

$\overline{PD_S}$ is an average of a block dummy pattern density;

$\overline{PD_0 \cdot PD_S}$ is an average of a product of the main pattern density and the block dummy pattern density; and $\sigma$ is defined by a formula $\sigma^2 = \overline{PD^2} - \overline{PD}^2$, where PD is a total pattern density defined in a formula $PD = PD_0 + rPD_S$ and r is a block dummy density ratio, $\sigma_S$ is defined by a formula $\sigma_S^2 = \overline{PD_S^2} - \overline{PD_S}^2$.

11. The method of claim 1, wherein the determining the target block dummy density ratio R of the IC design layout is further according to process window and throughput.

12. The method of claim 1, wherein the associated maximum intensity is lower than a model threshold by a predetermined margin, wherein the model threshold is based on a simulated critical dimension.

13. The method of claim 1, wherein the generating the modified IC design layout by adding the dummy features to the IC design layout comprises adding the dummy features to a polysilicon design layer included in the modified IC design layout.

14. An integrated circuit (IC) fabrication method comprising:

extracting, by a computer processor, an IC design layout presented in one or more data files, the IC design layout designed to be formed on a semiconductor substrate and including a subdivisional area, wherein the subdivisional area includes a plurality of main features and a plurality of space blocks;

calculating, by the computer processor, an optimized block dummy density ratio $r_0$ of the IC design layout to obtain an optimized uniformity of pattern density (UPD), the optimized block dummy density ratio $r_0$ being calculated from a total pattern density associated with the subdivisional area of the IC design layout;

determining a target block dummy density ratio R of the IC design layout according to the optimized block dummy density ratio $r_0$ and processing window;

choosing a type of non-printable dummy features according to an associated maximum intensity that is less than an exposure threshold dose of at least one of the main features;

generating a pattern of the non-printable dummy features according to the target block dummy density ratio R;

generating a modified IC design layout by adding the non-printable dummy features to the IC design layout; and fabricating an integrated circuit according to the modified IC design layout.

15. The method of claim 14, wherein the generating the modified IC design layout by adding the non-printable dummy features to the IC design layout comprises adding the non-printable dummy features to a polysilicon design layer included in the IC design layout.

16. The method of claim 14, wherein the determining the target block dummy density ratio R of the IC design layout according to the optimized block dummy density ratio $r_0$ includes determining the target block dummy density ratio based on a statistical measure of the total pattern density associated with the subdivisional area.

17. The method of claim 16, wherein the statistical measure of the total pattern density is based on a standard deviation of an actual block dummy density ratio r.

18. An integrated circuit (IC) fabrication method comprising:

extracting, by a computer processor, an IC design layout presented in one or more data files, the IC design layout including a subdivisional area having a plurality of main features and a plurality of space blocks;

calculating, by the computer processor, an optimized block dummy density ratio $r_0$ of the IC design layout to obtain an optimized uniformity of pattern density (UPD), the optimized block dummy density ratio $r_0$ being calculated from a total pattern density associated with the subdivisional area of the IC design layout;

determining a target block dummy density ratio R of the IC design layout according to the optimized block dummy density ratio $r_0$ and throughput;

choosing a type of sub-resolution dummy features according to an associated maximum intensity that is less than an exposure threshold dose of at least one of the main features;

generating a pattern of the sub-resolution dummy features according to the target block dummy density ratio R;

generating a modified IC design layout by adding the sub-resolution dummy features to a polysilicon design layer included in the IC design layout; and fabricating an integrated circuit according to the modified IC design layout.

19. The method of claim 18, wherein the associated maximum intensity is lower than a model threshold by a predetermined margin, wherein the model threshold is based on a simulated critical dimension.

20. The method of claim 18, wherein the generating the pattern of the sub-resolution dummy features includes generating square type features with size A and configured in an array with a pitch p such that a ratio $A^2/p^2$ is equal to the target block dummy density ratio R.

* * * * *